United States Patent Office 3,325,149
Patented June 13, 1967

3,325,149
POWER TRANSMISSION
Melvin H. Woodward, 785 Sutter St.,
Yuba City, Calif. 95991
Filed May 17, 1966, Ser. No. 550,753
6 Claims. (Cl. 254—187)

My invention relates to power transmissions and more particularly to a type that is especially arranged for hoists, cranes and shovels in that provision is made for application of power to the hoisting or digging implements of the associated apparatus during raising and lowering and including provision for a free fall of the load under a stated control.

For convenience in describing the invention, raising and lowering of the load will be referred to as "power up" and "power down" or "free fall" applications, respectively.

One object of the invention is to provide a transmission of the character indicated in which power up and power down applications are at all times under infinitely smooth, positive control and including a like control during transition from up to down and vice versa.

A further object is the provision of such a transmission in which control is exercised by a single lever and which is further characterized by a fail safe construction that, in the event of failure of the hydraulic control circuitry, will enable a brake to prevent free dropping of the load.

A further object is to provide a transmission as set forth in which the infinitely smooth power up and power down controls of the load are independent of engine speed.

A further object is to provide a transmission that may be conditioned, the up clutch and brake being released, for either a free fall or a power down lowering of the load and wherein a freewheel clutch engages during free fall or a clutch brake engages during power lowering, respectively, to limit the speed of the lowering load to that of the power source, and in which either conditioning of the transmission is related to a single stage, rotating housing, hydraulic torque converter forming part of the power up train so as to insure recovery control of a load being lowered, free fall or power down, by engagement of the power up clutch.

Figure 1:
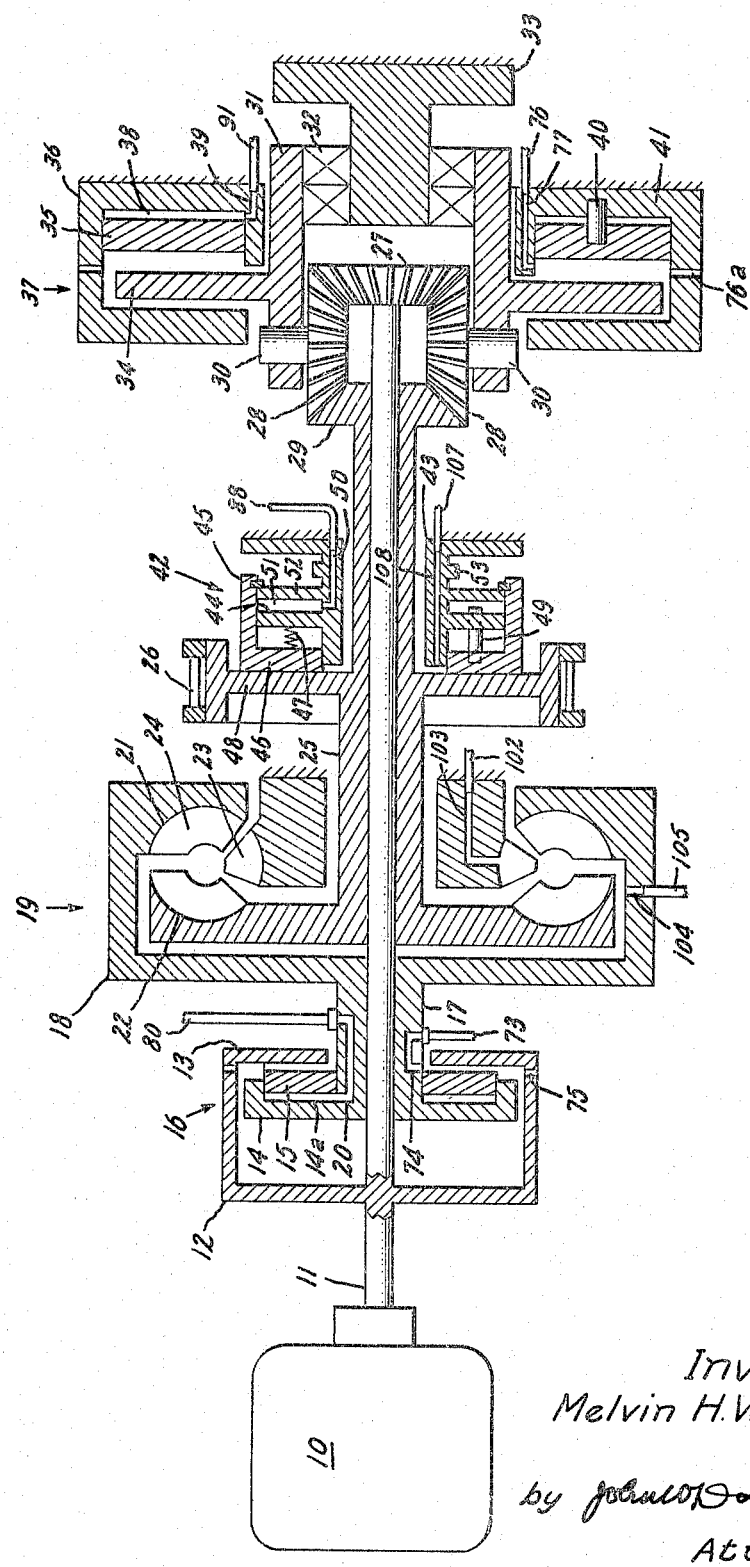
FIG. 1 is a sectional and schematic elevation of one form of the improved transmission which includes a single stage, rotating housing, hydraulic converter, a power up clutch, a power down clutch brake, an output brake and a freewheel clutch, the up clutch and clutch brake being shown released and the output brake engaged.

Referring to FIG. 1, the numeral 10 designates a suitable power source whose output shaft 11 is drivably connected to an annular housing 12 which is provided with an annular abutment ring 13. Included within the housing 12 is an annular cylinder 14 which is coaxial with the shaft 11 and has slidable therein an annular piston 15. The abutment ring 13, cylinder 14 and piston 15 constitute a hydraulically actuated, power up, friction clutch 16 which may be modulatingly engaged as hereinafter described to transmit power through a sleeve shaft 17 to the housing 18 of a single stage, rotating housing, hydraulic torque converter 19. Actuating medium for the clutch 16, usually a suitable oil, is supplied to an apply chamber 14ª included between the cylinder 14 and piston 15 through a passage 20 and the latter is incorporated in an oil circuit presently described.

The housing 18 is provided with an impeller 21 and the converter 19 otherwise includes a turbine 22 and stator 23 which together with the impeller 21 are related in a toroidal circuit 24. The turbine 22 connects through a sleeve shaft 25 with a sprocket 26 which constitutes the output of the transmission.

So far as described, it will be apparent that, with the clutch 16 engaged to any desired extent, the drive from the power source 10 is successively through the clutch 16 and converter 19 to the sprocket 26 and this drive provides power-up movements of the load. Free fall and power down movements of the load are selectively determined by the following instrumentalities.

The shaft 11 extends coaxially through the sleeve shafts 17 and 25 and beyond the sprocket 26 and carries on the end thereof a bevel gear 27 which meshes with intermediate bevel gears 28—28 that in turn mesh with a bevel gear 29 fast on the adjacent end of the sleeve shaft 25. The bevel gears 28—28 are provided with stub shafts 30—30 which are journaled in a carrier sleeve 31 that is coaxial with the shaft 11 and connects through a schematically shown freewheel clutch 32 with a stationary support 33.

The carrier sleeve 31 is provided with an attached abutment ring 34 which, together with an annular piston 35 axially slidable in a stationary, annular housing 36, constitute a hydraulically actuated, power down, friction clutch brake 37 which is engageable to provide power down movements of the load. The piston 35 defines with the housing 36 an apply chamber 38 for receiving the actuating oil through a passage 39 in the housing 36 and which passage is tied in with an oil circuit presently described. The piston 35 may be held against rotation in any conventional manner, such as by a plurality of pins 40, only one being shown, which extend within the piston 35 and the end wall 41 of the housing 36.

There is associated with the output sprocket 26 a spring applied brake 42 which when fully engaged will hold the load in any position and which may be modulatingly released to provide any desired degree of braking restraint. Further, if released at a time when hydraulic power fails, the brake 42 will automatically engage to hold the load stationary.

The brake 42 includes a stationary sleeve 43 that is coaxial with the shaft 11 and sleeve 25 and has fast thereto an annular reaction member 44. Slidable on the periphery of the reaction member 44 is an annular piston 45 carrying an inwardly extending, annular plate 46 and a plurality of springs 47 suitably spaced around the piston 45 between the reaction member 44 and plate 46 bias the latter to the fully engaged position shown in which the plate 46 frictionally engages the web 48 of the sprocket 26. A plurality of pins 49 are suitably spaced around the brake 42 and have their ends respectively slidable through the reaction member 44 and anchored in the plate 46 for the purpose of holding the piston 45 against rotation. For convenience, only one spring 47 and one pin 49 are shown.

Modulating release of the brake 42 is achieved by supplying pressure oil through a passage 50 in the sleeve 43 to an annular release chamber 51 included between the reaction member 44 and an annular plate 52 that is movable with the piston 45. Movement of the piston 45 in the release direction is limited by engagement of the plate 52 with an annular boss 53 provided on the sleeve 43.

Figure 2:
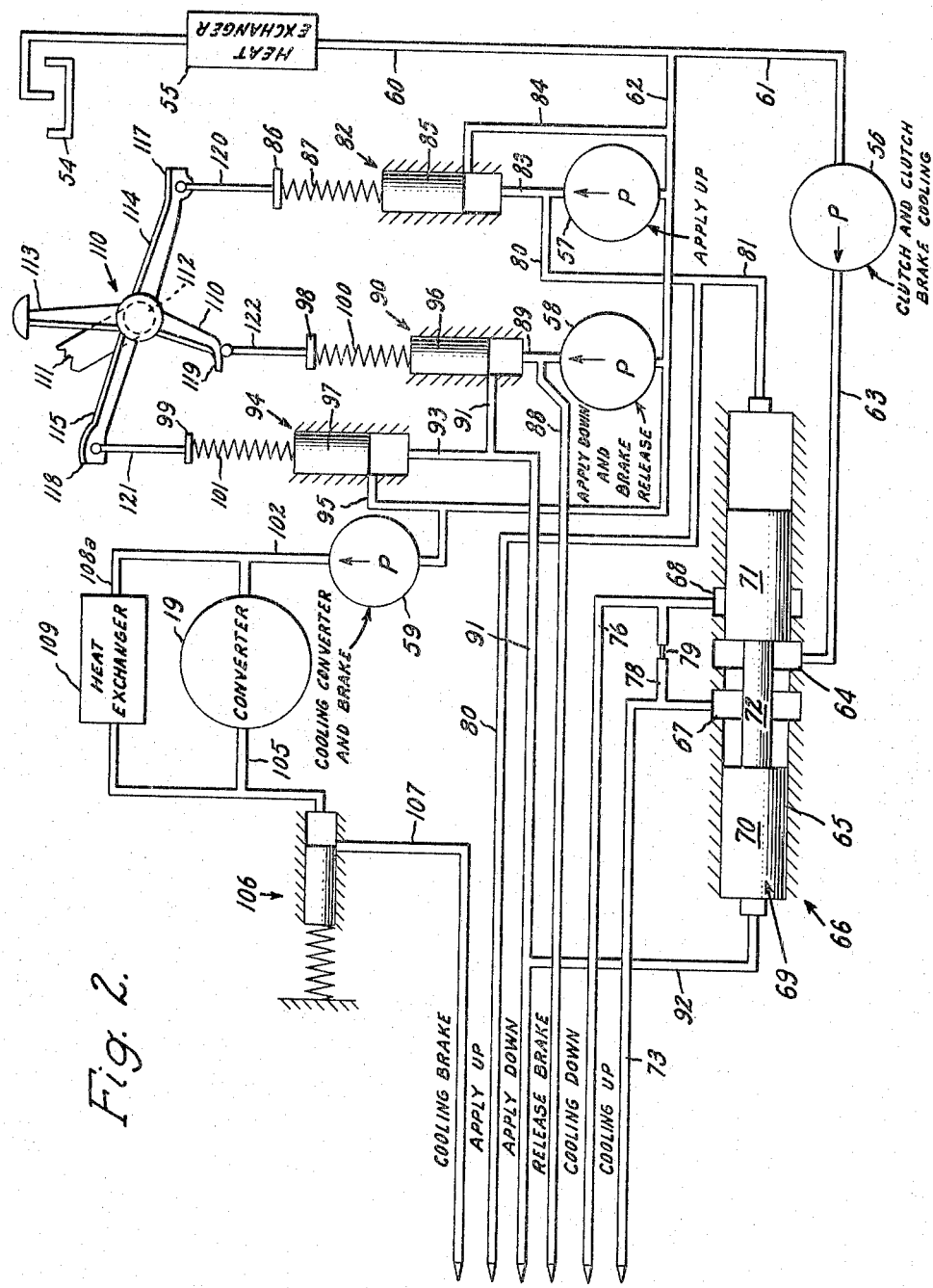
FIG. 2 is a schematic of the oil circuitry for the FIG. 1 transmission conditioned to establish the relations shown therein.

The oil circuit for the FIG. 1 transmission is shown in FIG. 2 to which reference will now be made. The oil is withdrawn from a convenient sump 54 through a heat exchanger 55 by means of positive displacement pumps 56, 57, 58 and 59. The heat exchanger outlet pipe 60 connects with an inlet pipe 61 for the pump 56 and also with an inlet pipe 62 for the pumps 57, 58 and 59. The pumps 57, 58 and 59 are in parallel flow relation as a group and in like relation to the pump 56.

The pump 56 provides cooling oil flow for the friction elements of the power-up clutch 16 and clutch brake 37 by an arrangement which, under operating conditions, enables more flow to which of the elements, up clutch 16 or down clutch brake 37, is engaged than to the released element. For this purpose, the outlet pipe 63 from the pump 56 connects with an inlet port 64 provided in the casing 65 of a position valve 66 and the casing 65 also includes outlet ports 67 and 68 which are on opposite sides, respectively, of the inlet port 64. Slidable in the casing 65 is a conventional spool member 69 having end lands 70 and 71 which are connected by a reduced neck 72.

The position valve 66 always occupies one of two positions, viz., either that shown or one in which the spool member 69 is displaced to the extreme right of that shown. The means for effecting shifts of the position valve 66 will be presently described. For convenience, it will be assumed that the position valve 66 is located as shown, such as could occur at the end of a previous operation with the up clutch and clutch brake released and the brake engaged. In the shown position of the spool member 69, the inlet and outlet ports 64 and 67, respectively, are in communication to provide oil flow through a pipe 73 which connects with a passage 74 (see FIG. 1) leading to the friction elements of the up clutch 16. The cooling oil may be conveniently discharged through apertures 75 in the peripheral wall of the housing 12. At this time, while the outlet port 68 is masked by the land 71, provision is made for a limited oil flow from the pipe 73 to a pipe 76, one end of which connects with the outlet port 68 and the opposite end with a passage 77 (see FIG. 1) leading to the friction elements of the down clutch brake 37. This cooling oil may be discharged through apertures 76a in the peripheral wall of the housing 36. The limited oil flow is effected by a pipe 78 bridged between the pipes 73 and 76 and including an orifice 79. From the foregoing, it will be apparent that with the up clutch 16 engaged, the major cooling oil supply will be delivered thereto and a substantially less quantity to the down clutch brake 37.

The inlet of the pump 57 connects with the pipe 62 and its outlet connects through a pipe 80 with the passage 20 (see FIG. 1) for supplying pressure oil to the apply chamber 14a of the up clutch 16. A pipe 81 connects the pipe 80 with the right end of the position valve casing 65 and the pressure thus supplied holds the spool member 69 in the left position shown in FIG. 2 during up movement of the load.

The pressure in the apply chamber 14a may be varied as desired to provide any torque transmitting condition of the up clutch 16 by means of a controlled pressure regulating valve 82 whose inlet connects by a pipe 83 with the pipe 80 and hence with the outlet of the pump 57. The outlet of the valve 82 connects by a pipe 84 with the pipe 62. The valve 82 includes a conventional piston 85 and interposed between the piston 85 and a push plate 86 is a spring 87. Movement of the push plate 86 towards the piston 85, determined as presently described, provides a means for controllably varying the pressure in the pipe 80 and hence that in the apply chamber 14a of the up clutch 16.

The inlet of the pump 58 connects with the pipe 62 and its outlet connects through a pipe 88 with the passage 50 (see FIG. 1) leading to the release chamber 51 of the brake 42. A pipe 89 connects with the pipe 88 and hence with the outlet of the pump 58 and also with the inlet of a controlled pressure regulating valve 90 whose outlet connects through a pipe 91 with the passage 39 (see FIG. 1) leading to the apply chamber 38 of the down clutch brake 37. The pipe 91 also connects through a pipe 92 with the left end of the position valve casing 65 to shift the spool member 69 to the extreme right when pressure is established, as presently described, in the apply chamber 38 of the down clutch brake 37. The major portion of the cooling oil supply is then diverted to the friction elements of the down clutch brake 37 through the pipe 76.

A pipe 93 connects the pipe 91 with the inlet of a controlled pressure regulating valve 94 whose outlet connects by a pipe 95 with the pipe 62. The valves 90 and 94 include conventional pistons 96 and 97 and interposed between these pistons and push plates 98 and 99 are springs 100 and 101, all respectively. Movements of the push plates 98 and 99, selectively determined and controlled as presently described, provides means for selectively and controllably varying the pressures in the release chamber 51 of the brake 42 and in the apply chamber 38 of the down clutch brake 37.

From the above, it will be apparent that, under certain conditions, the regulating valve 94 is in back pressure relation to the regulating valve 90 in the sense that when full pressure is present in the down clutch brake apply pipe 91, it is also present in the brake release pipe 88. This arrangement positively insures release of the brake 42 when the down clutch brake 37 is fully engaged.

The inlet of the pump 59 connects with the pipe 62 and its outlet connects through a pipe 102 with a passage 103 (see FIG. 1) leading to the toroidal circuit 24 of the converter 19. Oil discharged from the converter flows successively through a passage 104 in the converter 19 and a pipe 105 to the inlet of a conventional pressure regulating valve 106 whose outlet connects through a pipe 107 with a passage 108 (see FIG. 1) to supply cooling oil to the brake 42, the regulating valve 106 maintaining a basic pressure in the converter 19. Bridged around the converter 19 and connecting with the pipes 102 and 105 is a pipe 108a which includesa heat exchanger 109. The latter cools the converter 19 by auto-circulation and dissipation of the energy arising from the control of a falling load is limited only by the capacity of the heat exchanger 109.

A single control member is employed to infinitely control the pressure regulating valves 82, 90 and 94 to determine any desired torque transmitting condition of the up clutch 16 and the down clutch brake 37, respectively, and any desired retarding restraint of the brake 42.

The control member 110 is for convenience shown in isometric view and is mounted on a fixed support 111 for universal movement as schematically indicated by the ball 112. The member 110 includes a handgrip 113, arms 114 and 115 extending oppositely from the grip 113 and generally normal thereto, and a third arm 116 lying generally in the same plane as the arms 114 and 115 and generally normal thereto. The outer ends of the arms 114, 115 and 116 may be enlarged to provide platforms 117, 118 and 119 against which constantly bear the enlarged ends of pushrods 120, 121 and 122 whose opposite ends carry the push plates 86, 99 and 98, all respectively.

Considering the operation of the transmission, it is convenient to begin with the conditioning thereof as shown in FIGS. 1 and 2, the up clutch 16 and down clutch brake 37 being released and the brake 42 engaged. This initial position may occur with the load in its lowermost position or at some higher elevation; in the latter case, the brake 42 holds the load stationary.

To initiate an up movement of the load, for example, the handgrip 113 is moved to cause a movement of the arm 116 such as to begin loading the spring 100 to increase pressure in the release chamber 51 of the brake 42. If the load is in its lowest position, the brake release pressure can be quickly raised to its maximum value before clockwise rocking of the grip 113 to begin loading the spring 87 while maintaining the release loading on the spring 100. Loading of the spring 87 provides for pressure rise in the apply chamber 14a of the up clutch 16 and the load can be picked up smoothly by suitably controlling this pressure.

If the load is in an elevated position when further up movement is desired, smooth pickup of the load can be obtained while guarding against any dropping of the load by properly relating the modulating release of the brake 42 and the modulating engagement of the up clutch 16. As the load approaches the terminal up position, it may be inched to its proper location by the infinite control possible for the up clutch 16.

Down movements of the load may be effected in either of two ways, i.e., what may be termed a free fall or a power down fall, the up clutch 16 being released in both situations as is also the brake 42 and the down clutch brake 37 is released during free fall. During free fall, the sprocket 26 drives through the bevel gear 29 to the intermediate gears 28—28, while the shaft 11 drives through the bevel gear 27 to the intermediate gears 28—28 which, due to the release of the down clutch brake 37 effect a rotation of the carrier sleeve 31. If the free falling load tries to overrun the power source 10, the freewheel clutch 32 locks and holds the carrier sleeve 31 stationary so the speed of the sprocket 26 will be limited to that of the power source 10 which always rotates in the up direction.

For a condition where a very light load will not turn the machinery over in the down direction, clutch brake 37 is modulated for partial or full engagement to thereby, through the gears 27, 28 and 29, cause the power source 10 to directly drive the sprocked 26 in the down direction, this being at power source speed when the clutch brake 37 is fully engaged.

An important feature of the invention is the capacity for recovering full control of a falling load, whether free or power fall, by engagement of the up clutch 16. During either type of load fall, the up clutch 16 is disengaged so, for purpose of description, the turbine 22, then driven by the sprocket 26, may be regarded as rotating reversely relative to its normal or forward rotation when the up clutch 16 is engaged to drive the impeller 21 forwardly for up movements of the load. During such reverse rotation of the turbine 22, the converter 19 is characterized by a negative speed ratio.

With a negative speed ratio condition, recovery control of the falling load is not possible if the converter 19 uncouples when the up clutch 16 is engaged. Uncoupling means that if the impeller 21 is driven forward, or in the up direction, at some normal speed, and the load is sufficiently heavy to cause the turbine 22 to continue reverse rotation, negative speed ratio to the uncoupling point, the torque resisting the falling load will decrease rapidly and the load will fall with increasing speed.

In the present instance, uncoupling is prevented and recovery control is assured by providing a maximum negative speed ratio as determined by the ratio of the gears 27, 28 and 29 such that when the impeller 21 is driven forward or in the up direction, the turbine 22 will be rotating reversely at the same speed. In the FIG. 1 transmission, this speed ratio is fixed at 1:1 by providing a 1:1 gear ratio in the gear train including the gears 27, 28 and 29. Converters can be selected where a negative 1:1 speed ratio will produce an output torque sufficient to recover control by stopping any load which can be lifted, and with some converters, this torque is greater than stall torque.

Figure 3:
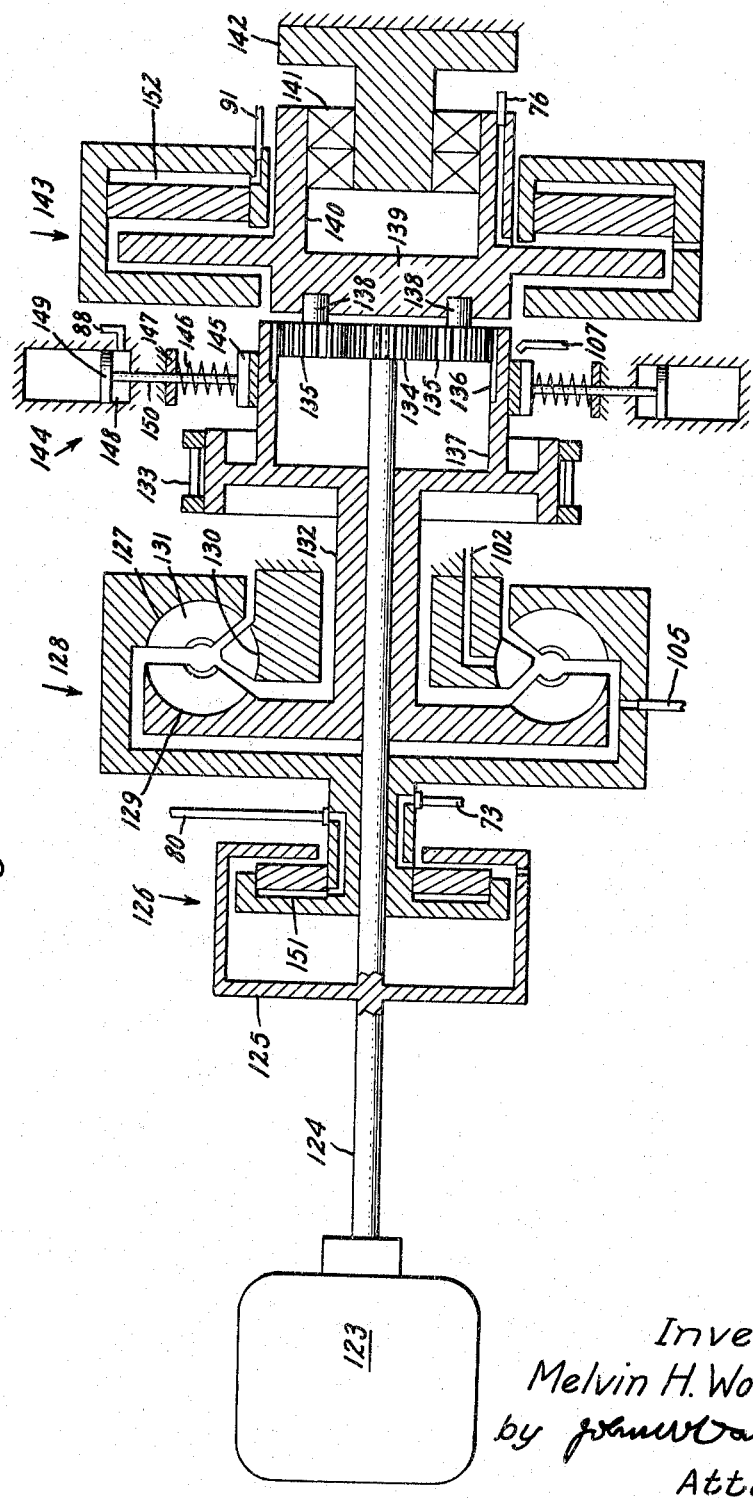
FIG. 3 is a modification in sectional elevation of the FIG. 1 transmission.

In FIG. 3 is shown a variant form of the transmission in which the gear train has a gear ratio of other than 1:1 to insure with any converter a negative speed ratio that will produce an output torque greater than necessary to arrest and lift the falling load when the up clutch is engaged.

Referring to FIG. 3, the numeral 123 designates a power source whose output shaft 124 drivably connects with an annular housing 125 forming part of a hydraulically actuated, power up, friction clutch 126 which has functional characteristics similar to the up clutch 16 in FIG. 1. When engaged and as in FIG. 1, the up clutch 126 drives the impeller 127 of a single stage, rotating housing converter 128 which otherwise includes a turbine 129 and a stator 130 all arranged in a toroidal circuit 131. The turbine 129 connects through a sleeve shaft 132 with a sprocket 133 which constitutes the output of the transmission.

Free fall and power down movements of the load are selectively determined as follows. The shaft 124 extends coaxially through and beyond the sprocket 133 for connection with a spur gear 134 which mesh, for example, with a pair of intermediate spur gears 135—135 that in turn mesh with an internally toothed portion 136 of an annulus 137 attached to the sprocket 133. The spur gears 135—135 are provided with stub shafts 138—138 that are journaled in a transverse wall 139 forming part of a carrier sleeve 140 that is coaxial with the shaft 124 and connects through a schematically shown freewheel clutch 141 with a stationary support 142. The carrier sleeve 140 is also related, as shown in FIG. 1, to a hydraulically actuated, power down, friction clutch brake 143.

To hold the load in any position and characterized by the same modulating capacity as the brake 42 in FIG. 1, a brake 144 is provided. The latter brake includes a brake band or shoes 145 which are biased to engaging position by springs 146 interposed therebetween and fixed abutments 147. Modulating release of the band or shoes 145 is effected by pressure oil supplied to chambers 148 in which are reciprocable pistons 149 that connect by rods 150 with the shoes or band 145.

The circuitry control for the FIG. 3 transmission is identical with FIG. 2 and, in this connection, it will be understood that, in the latter figure, the pipe 80 connects with the apply chamber 151 of the up clutch 126, the pipe 91 connects with the apply chamber 152 of the down clutch brake 143, the pipes 73, 76 and 107 connect, respectively, with the friction surfaces of the up clutch 126, down clutch brake 143 and brake 144, the pipe 88 connects with the release chambers 148 of the brake 144, and oil is supplied to and discharged from the toroidal circuit 131 by pipes 102 and 105, respectively. Modulating control of the up clutch 126, down clutch brake 143 and brake 144 is effected by the control member 110 (see FIG. 2) in the same manner as described for the FIG. 1 transmission.

The FIG. 3 transmission distinguishes from that shown in FIG. 1 in the showing generally of a gear train which, in FIGS. 1 and 3 may be regarded as a reverse gear train, is characterized by gear ratio of other than 1:1. Such a gear train would be employed in connection with a converter which would otherwise uncouple at a negative speed ratio of 1:1 and the effect of the gear train is to hold such a converter to a negative speed ratio of 1:1 or less so that recovery control of the falling load is possible when the up clutch 126 is engaged.

The precise arrangement of the gear trains in FIGS. 1 and 3 is not by way of limitation, the sole requirement being that they shall provide for falling movements of the load and shall be characterized by gear ratios of 1:1 or other than 1:1 depending upon the nature of the converter.

I claim:

1. For use with apparatus having means for hoisting and lowering a load, a power transmission connectible to a power source and including hoisting and lowering trains having a common output arranged for connection to the input of the apparatus, the hoisting train including in series flow relation a hydraulically controlled friction clutch for providing connection with the power source, a single stage, rotating housing, hydraulic torque converter having an impeller and a turbine and the common output, and the lowering train including in series flow relation a reverse gear train connected to the power source and the common output, and means for recovering control of and bringing a lowering load to a stop position by engaging the friction clutch including a gear ratio in the reverse gear train adapted to establish a negative speed ratio not greater than that at which the output torque of the converter is greater or equal to its stall torque when the friction clutch is engaged, and means for anchoring a part of the reverse gear train to limit the lowering speed of the output to the speed of the power source.

2. A power transmission as defined in claim 1 wherein the gear ratio for the reverse gear train is 1:1.

3. A power transmission as defined in claim 1 wherein the converter is characterized by uncoupling at a negative speed ratio other than 1:1 and is held to this ratio or less by providing for the reverse gear train a similar gear ratio or less.

4. A power transmission as defined in claim 2 wherein the reverse gear train includes first and second bevel gears respectively connected to the power source and common output and intermediate bevel gears meshing with the first and second bevel gears, the intermediate bevel gears being journaled in a member having connection with the anchoring means.

5. A power transmission as defined in claim 3 wherein the reverse gear train includes first and second spur gears respectively connected to the power source and the common output and intermediate spur gears meshing with the first and second spur gears, the intermediate spur gears being journaled in a member having connection with the anchoring means.

6. A power transmission as defined in claim 1 wherein the anchoring means is selectively controlled to provide a free fall or a power lowering of the load and including a freewheel clutch and clutch brake respectively connected to said part of the reverse gear train.

References Cited

UNITED STATES PATENTS

| | | | |
|---|---|---|---|
| 2,666,876 | 1/1954 | Sinclair | 254—135 |
| 3,128,861 | 4/1964 | Trondsen | 254—187 |

EVON C. BLUNK, *Primary Examiner.*

H. HORNSBY, *Assistant Examiner.*